United States Patent [19]

Tracy et al.

[11] 4,328,768

[45] May 11, 1982

[54] HYDROGEN FUEL STORAGE AND DELIVERY SYSTEM

[75] Inventors: Joseph C. Tracy, Romeo; Jan F. Herbst, Utica, both of Mich.

[73] Assignee: General Motors Corporation, Detroit, Mich.

[21] Appl. No.: 171,753

[22] Filed: Jul. 24, 1980

[51] Int. Cl.³ .................... F02M 31/00; B01D 59/10
[52] U.S. Cl. ..................... 123/1 A; 123/DIG. 12; 55/16; 55/158
[58] Field of Search ............... 123/1 A, DIG. 12, 23, 123/24; 55/16, 68, 158

[56] References Cited

U.S. PATENT DOCUMENTS

| 3,019,853 | 2/1962 | Kohman | 55/16 |
| 3,100,868 | 8/1963 | McAfee | 55/16 |
| 3,184,899 | 5/1965 | Frazier | 55/16 |
| 3,262,251 | 7/1966 | Hicks | 55/158 |

FOREIGN PATENT DOCUMENTS 1439440  6/1976  United Kingdom .............. 123/1 A

*Primary Examiner*—Ronald H. Lazarus
*Attorney, Agent, or Firm*—Donald F. Scherer

[57] ABSTRACT

Hydrogen gas filled hollow hole-free microspheres are stored in a chamber. The microspheres are directed from the storage chamber to a heated chamber where the hydrogen gas is diffused through the outer surface of the microspheres and delivered to an engine for use as a fuel. After substantially all the hydrogen gas is removed, the microspheres are transported to another storage chamber from which they are completely removed for refilling with hydrogen gas while the first mentioned storage chamber is refilled with fueled microspheres.

2 Claims, 1 Drawing Figure

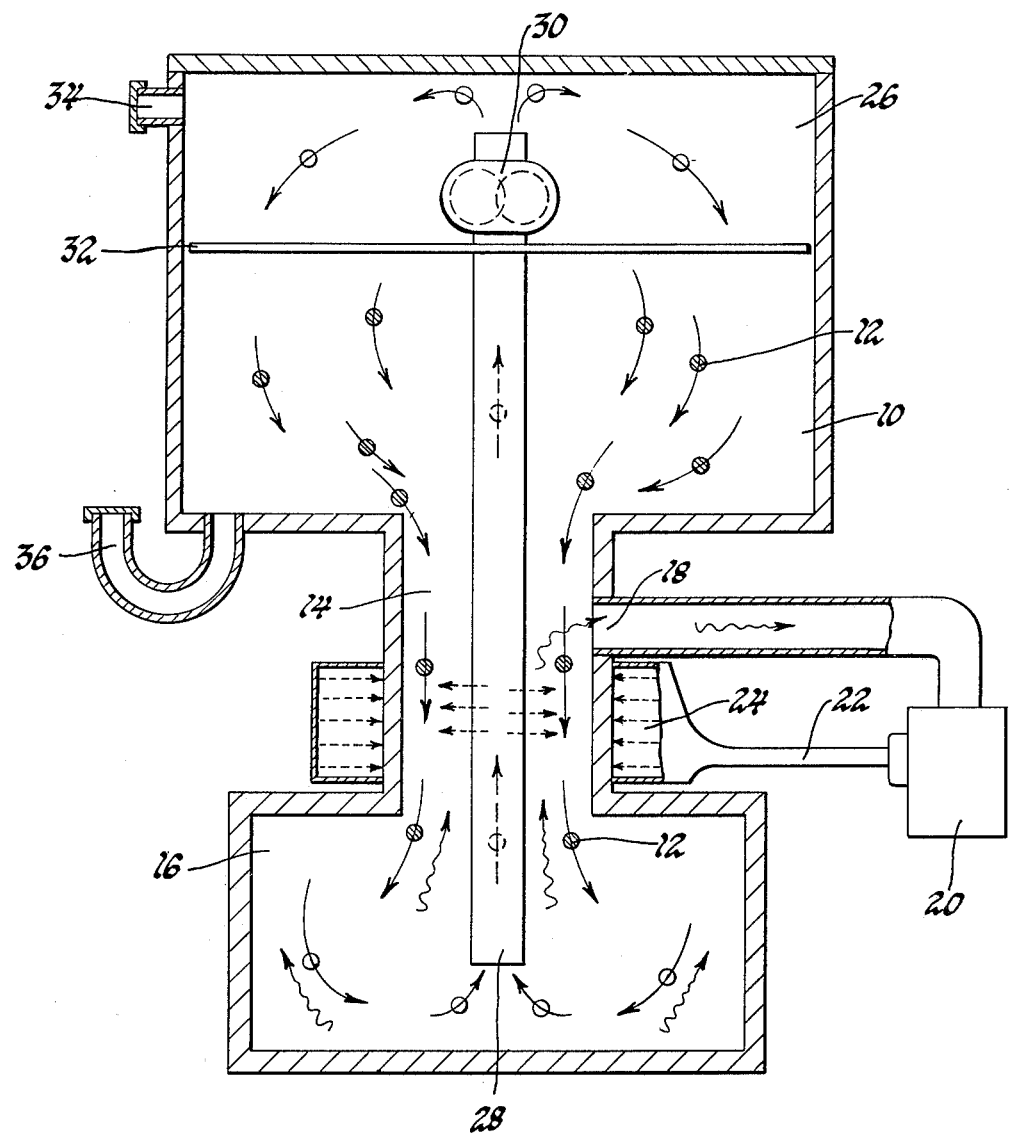

HYDROGEN FUEL STORAGE AND DELIVERY SYSTEM

This invention relates to fuel storage systems and more particularly to such systems for storing and delivering hydrogen gas to an engine.

It is well-known that hydrogen is a very efficient and clean-burning fuel. There are, however, some difficulties in storing hydrogen prior to its use within the engine. Most generally, the hydrogen is stored either in liquid form or as a gas under pressure in a large vessel. The liquid storage systems require significant insulation so that the liquid state can be maintained while the gas storage systems require large and heavy vessels.

The present invention utilizes microspheres filled with hydrogen gas at high pressure. The microspheres can be stored in conventionally designed storage chambers since they do not require ambient pressurization or substantial low temperature control. The process for storing gases in hollow hole-free microspheres is discussed in U.S. Pat. Nos. 2,892,508 issued to Kohman et al. June 30, 1959 and 3,184,899 issued to Frazier May 25, 1965.

More recent developments in the art of gas filled microspheres indicate that hydrogen gas can be stored at pressures of 400 atm.

It is therefore an object of this invention to provide an improved fuel storage and delivery system wherein hollow microspheres filled with hydrogen gas are stored in a fuel storage chamber from which the microspheres are directed through a heated delivery chamber wherein hydrogen gas is freed by diffusion and delivered to the engine after which the substantially emptied microspheres are delivered to a second storage chamber.

It is another object of this invention to provide an improved hydrogen storage and delivery structure wherein hydrogen gas filled microspheres are moved progressively from a storage chamber to a heated delivery chamber and diffusion chamber wherein the hydrogen gas is removed. From the diffusion chamber, the substantially emptied microspheres are removed by mechanical means, such as a pump, to a storage chamber from which they can be removed for refilling.

These and other objects and advantages of the present invention will be more apparent from the following description and drawing which is a diagrammatic representation of a fuel storage and delivery structure.

The structure has a fuel storage chamber 10 which is filled with microspheres 12. The microspheres 12 are closely packed in the fuel storage chamber 10 such that approximately 70% of the volume is filled with microspheres while the remaining 30% represents the spaces between microspheres. Thus, the fuel storage chamber has a packing fraction of 0.7. The microspheres 12 are directed from the fuel storage chamber 10 into a heated fuel delivery chamber 14 from which they pass into a diffusion chamber 16. The heated fuel delivery chamber 14 has connected thereto a fuel delivery passage 18 which is connected to a conventional hydrogen gas burning engine 20. As is well known, engines provided work output and waste heat. The waste heat from engine 20 is directed through a passage 22 into a chamber 24 which partially surrounds the heated fuel in delivery chamber 14. The heat from chamber 24 passes through the walls of the heated fuel delivery chamber 14 to cause the ambient temperature therein to rise.

As is well-known, the gas contained within the microspheres 12 will diffuse through the microspheres at a rate which increases with increasing temperature. By maintaining the fuel storage chamber 10 at substantially low ambient temperatures, such as 24° C., the amount of hydrogen gas escaping from the microspheres will be minimal. However, by maintaining the temperature of the heated fuel delivery chamber 14 in the diffusion chamber 16, the range of 300° to 350° C., the hydrogen diffusion from the microspheres 12 will be quite rapid.

The diffusion chamber 16 is in communication with a microsphere storage chamber 26 through a delivery chamber 28. Delivery passage 28 has incorporated therein a pump 30 which is effective to deliver substantially empty microspheres from the diffusion chamber 16 to the microsphere storage chamber 26. To conserve space and to provide the smallest overall package available in the system, the microsphere storage chamber 26 and the fuel storage chamber 10 share common boundaries and are separated by a floating seal 32. The floating seal 32 can be of the rolling seal variety or of the floating piston variety, the construction of either of which is well-known.

When substantially all of the microspheres have passed from the fuel storage chamber 10 through chambers 14 and 16 to the microsphere storage chamber 26, the empty microspheres can be removed through an opening 34 while the fuel storage chamber 10 can be refilled with charged microspheres through an opening 36.

By maintaining low ambient temperature conditions whenever the engine 20 is inoperable, the diffusion rate of the hydrogen gas from the microspheres 12 is minimal such that pressure generated within the system is also minimal. This is true even though the pressure within the fully charged microspheres may be as high as 400 atm. Thus, the structural integrity of the chambers 10, 14, 16 and 26 does not require the use of heavey gauge or thick metal walls. Therefore, the overall weight of the system is similar to conventional gasoline storage systems. While the system shown is a substantially continuous flow type system, various structures could be used wherein each of the chambers is separated from its predecessor and means are provided for mechanically moving the microspheres from one step in the fuel storage and delivery process to the next.

It should also be appreciated that if sufficient diffusion of hydrogen gas does not occur during engine shut down to permit restarting, external heat, such as from an electrical heater, can be provided to generate sufficient fuel for engine start. It should also be obvious to those skilled in the art that the microspheres stored in chamber 26 are not completely empty, hydrogen gas which might diffuse therein can be delivered by various means to either chamber 10, 14, or 16.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A hydrogen fuel storage structure for storing hollow microspheres filled with hydrogen gas and for freeing the hydrogen gas from the microspheres for delivery to an engine, said storage structure comprising; a fuel storage chamber for enclosing a plurality of microspheres filled with hydrogen gas; heated fuel delivery chamber means for freeing the hydrogen gas from the microspheres by heating; means for delivering the microspheres to the heated fuel delivery chamber means; means for delivering the freed hydrogen gas to an engine; means for directing the waste heat from the engine to heat the heated fuel delivery chamber; a microsphere storage chamber for storing the microspheres after the hydrogen gas is freed therefrom; and pump means for moving the microspheres from the heated fuel delivery chamber to the microsphere storage chamber.

2. A hydrogen fuel storage structure for storing hollow microspheres filled with hydrogen gas and for freeing the hydrogen gas from the microspheres for delivery to an engine, said storage structure comprising; a fuel storage chamber for enclosing a plurality of microspheres filled with hydrogen gas; heated fuel delivery chamber means connected to said fuel storage chamber for freeing the hydrogen gas from the microspheres by heating; a diffusion chamber adjacent said heated fuel delivery chamber for storing the microspheres at an elevated temperature after passage through said heated fuel delivery chamber; means for delivering the freed hydrogen gas to an engine; means for directing the waste heat from the engine to heat the heated fuel delivery chamber; a microsphere storage chamber for storing the microspheres after the hydrogen gas is freed therefrom; and pump means for moving the microspheres from the diffusion chamber to the microsphere storage chamber.

* * * * *

UNITED STATES PATENT AND TRADEMARK OFFICE
CERTIFICATE OF CORRECTION

PATENT NO. : 4,328,768
DATED : May 11, 1982
INVENTOR(S) : Joseph C. Tracy and Jan F. Herbst It is certified that error appears in the above—identified patent and that said Letters Patent is hereby corrected as shown below:

Column 1, line 33, after "wherein" insert -- the --.

Column 2, line 13, "chamber" should read -- passage --.

Signed and Sealed this

Fifth Day of October 1982

[SEAL]

Attest:

GERALD J. MOSSINGHOFF

Attesting Officer  Commissioner of Patents and Trademarks